W. H. ZIMMERMAN.
AUTOMOBILE TRACTOR.
APPLICATION FILED MAR. 31, 1913.
1,236,813.
Patented Aug. 14, 1917.
3 SHEETS—SHEET 3.
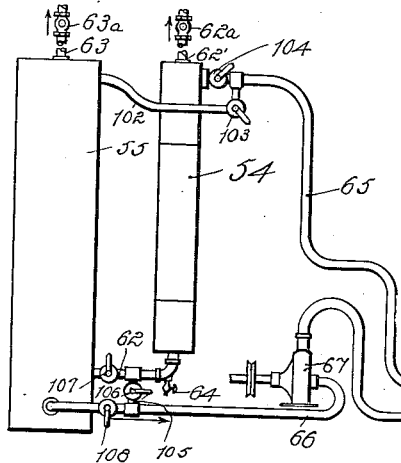
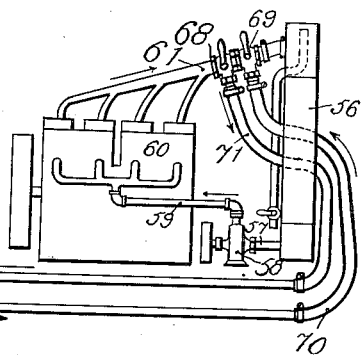
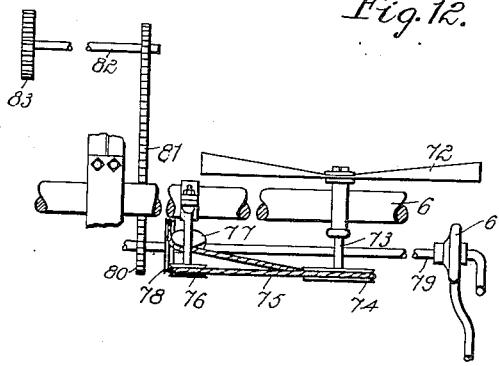
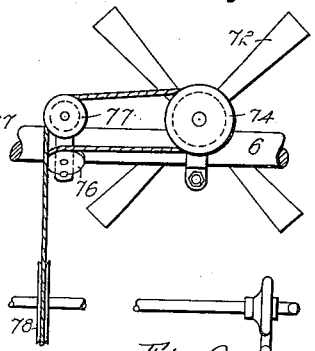
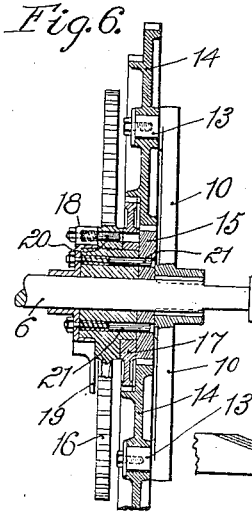
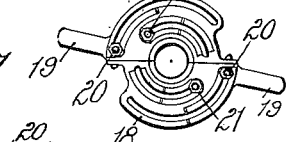
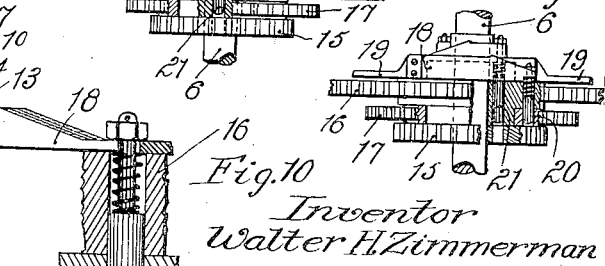
Witnesses:
Robert F. Bracke
Leslie W. Fricke
Inventor
Walter H. Zimmerman
By Brown Williams Bell Hansen & Boettcher
Attorneys

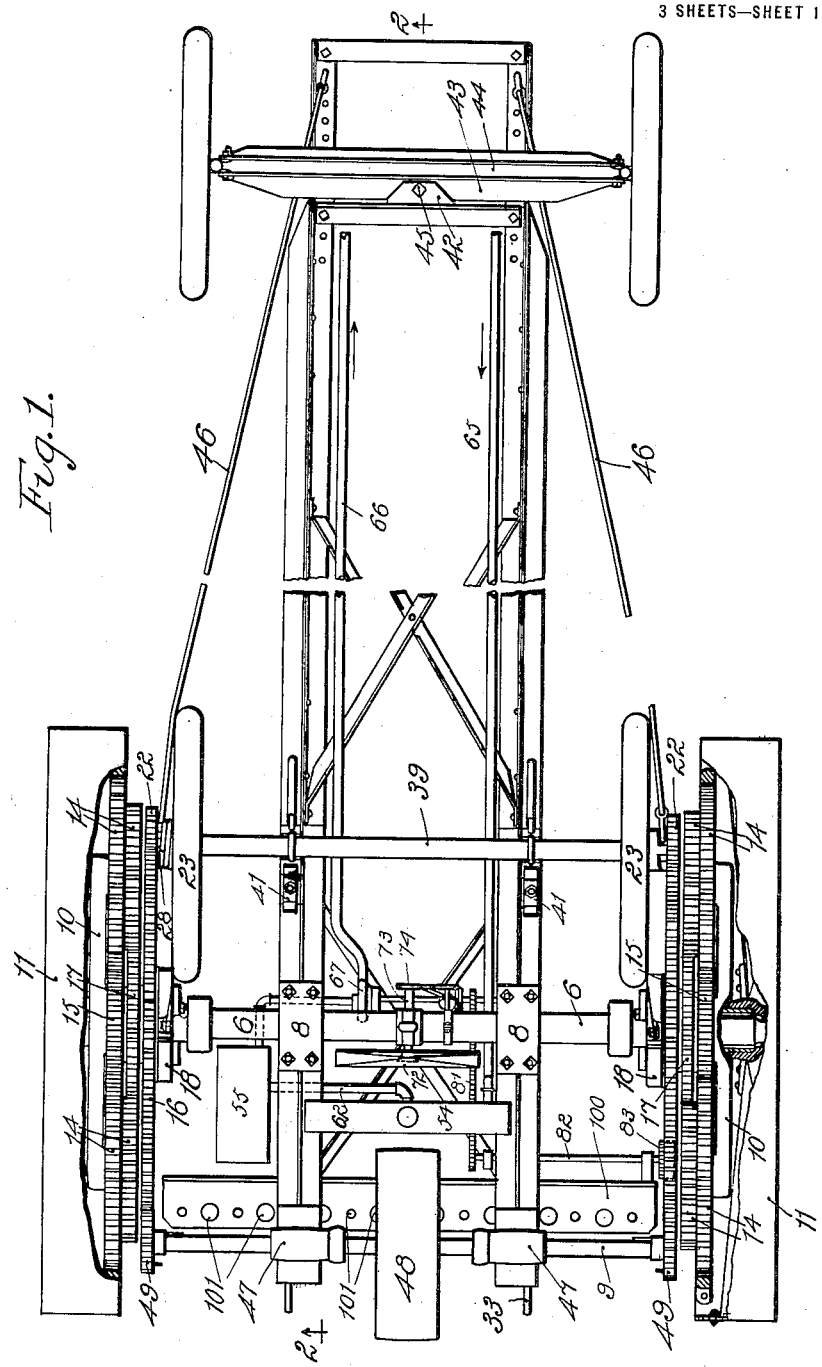

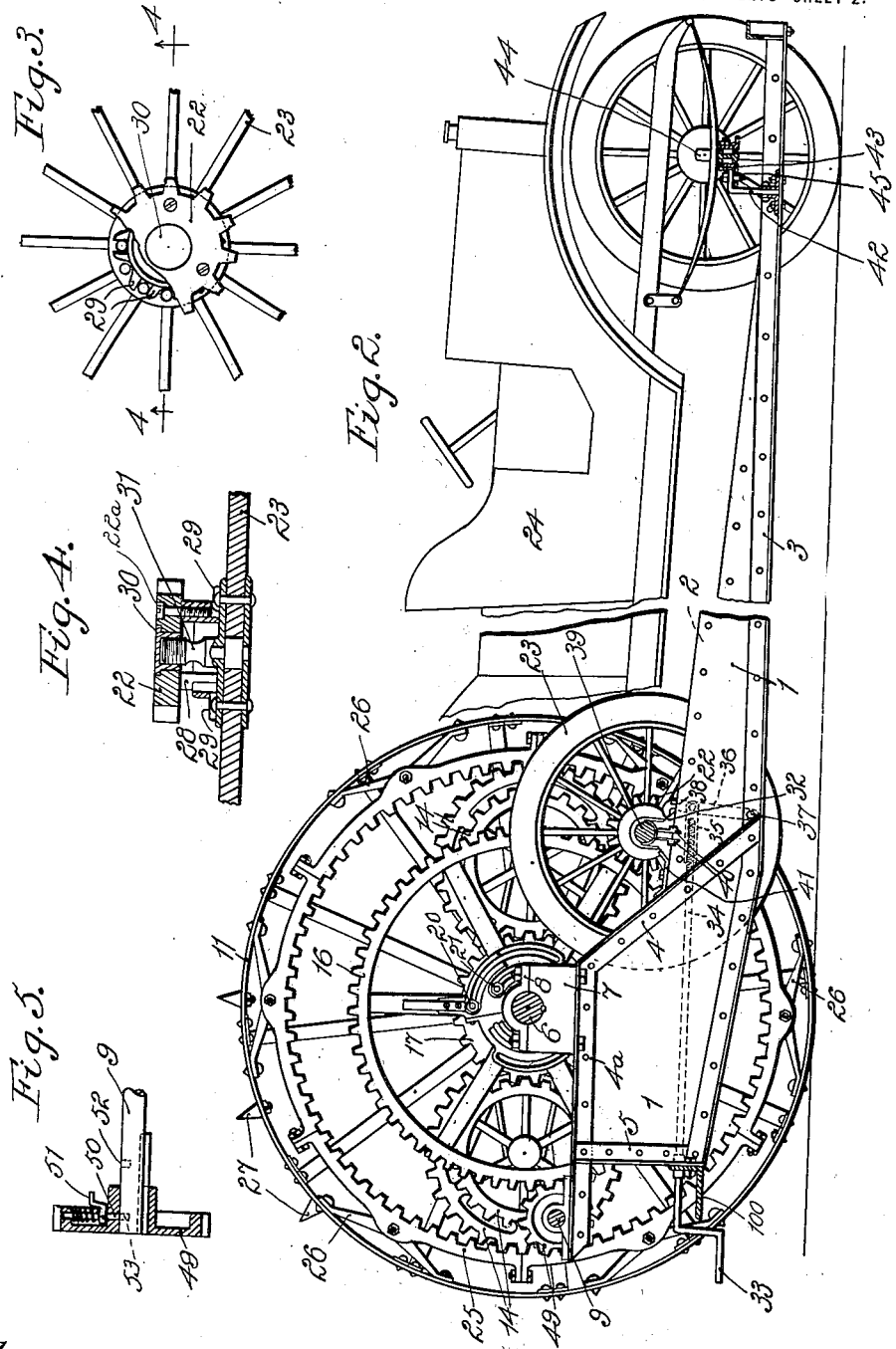

UNITED STATES PATENT OFFICE.

WALTER H. ZIMMERMAN, OF CHICAGO, ILLINOIS, ASSIGNOR, BY MESNE ASSIGNMENTS, TO AUTO TRACTOR COMPANY, OF NILES, MICHIGAN, A CORPORATION OF MICHIGAN.

AUTOMOBILE-TRACTOR.

1,236,813.  Specification of Letters Patent.  Patented Aug. 14, 1917.

Application filed March 31, 1913. Serial No. 757,803.

*To all whom it may concern:*

Be it known that I, WALTER H. ZIMMERMAN, a citizen of the United States, residing at Chicago, in the county of Cook and State of Illinois, have invented a certain new and Improved Automobile-Tractor, of which the following is a full, clear, concise, and exact description, reference being had to the accompanying drawings, forming a part of this specification.

My invention relates to an improved form of tractor mechanism by which an automobile is used as a source of power for driving the tractor mechanism, which mechanism is mounted upon a frame adapted to be temporarily attached to the automobile. The present application is an improvement on my copending application, Serial No. 643,826, and among the more prominent objects of my present invention are providing two driving ratios between the gears connected with the automobile wheels and the driving wheels of the tractor mechanism, either of which ratios may be employed as desired by the operation of a clutch mechanism particularly adapted to accomplish the result, and in providing mechanism for quickly and securely locating the automobile in place upon the tractor frame, and, further, in providing auxiliary radiating mechanism for the cooling water of the automobile engine, so that the slower speed of the device is compensated for by increased radiating capacity.

The above and other features of my invention will best be understood by reference to the accompanying drawings in which—

Figure 1 shows in plan view the tractor mechanism, a part of the main driving wheels being broken away to more clearly illustrate the gearing contained therein.

Fig. 2 shows the tractor mechanism illustrated in Fig. 1 in vertical section taken along the line 2—2, and in this view an automobile is shown in place upon the tractor frame.

Fig. 3 shows an outside end view of the pinion secured to one of the automobile hubs.

Fig. 4 is a horizontal section of the parts shown in Fig. 3, taken along the line 4—4.

Fig. 5 is a detail sectional view of clutch mechanism employed for driving a power shaft carried by the tractor frame.

Fig. 6 is a horizontal sectional view through the main shaft of the tractor mechanism, showing the gears employed and the clutch mechanism in position for the slow driving speed.

Fig. 7 shows a plan view and a partly horizontal section through the clutch pins, the clutch being shown in the neutral position with both traction driving gears disengaged.

Fig. 8 is a view similar to Figs. 6 and 7 showing the clutch mechanism moved to its fast driving speed position.

Fig. 9 shows the cam employed for operating the clutch pins indicated in Figs. 6, 7 and 8.

Fig. 10 is an enlarged sectional view showing one of the clutch pins and its relations to its operating cam surface.

Fig. 11 is a diagrammatic view showing the auxiliary radiator, circulating pump, storage tank and necessary piping and hose connections and valves for connecting the auxiliary cooling system in series with the cooling system of the automobile.

Fig. 12 shows in plan view the means employed for driving an auxiliary fan used in connection with the auxiliary radiator, and also an auxiliary water pump for circulating the water.

Fig. 13 shows the auxiliary fan and pump in elevation to more clearly show the fan driving mechanism.

Similar numerals refer to similar parts throughout the several views.

As shown in Figs. 1 and 2, the tractor frame consists of two side girders each of which consists of a web-plate 1 having upper and lower flange angle-bars 2 and 3 riveted thereto. These girders are of increasing depth as the rear end of the tractor frame is approached, since the bulk of the strain comes at this portion of the mechanism. Near the rear end of the girder, stiffening angle-bars 4 are riveted across the web-plates, and at the extreme rear end stiffening angle-bars 5 are similarly secured. The angle-bars 4 are bent at their upper ends so as to extend horizontally to constitute the top flanges 4ª of the rear end of the girders and these portions 4ª support the main shaft 6 by means of metal blocks 7 bolted thereto. The shaft 6 is securely held in position by caps 8 as indicated and prevented from rotation by means of suitable keys which engage the supporting blocks, as indicated in Fig. 2. The portions 4ª of the angle bars also support in suitable bearings a power shaft 9 for a purpose to be described.

The shaft 6 has rigidly mounted upon it near each end a double-arm 10 which is provided with a hub keyed to the shaft and around these hubs and the ends of the shaft the hubs of the main driving wheels 11 are rotatably supported. The main driving wheels 11 of the tractor are held in place on the shaft 6 by washers and cap screws, as indicated at 12 in Fig. 6. As shown more clearly in Fig. 6, the double arm 10 supports at each end a stud 13 upon which a double gear 14 is rotatably mounted, being held in place by washers and cap screws, as indicated. The larger gear of each of the double gears 14 meshes with a gear 15 loosely mounted upon the shaft 6 just inside of the double arm 10. Just inside of the gear 15, a large gear 16 is rotatably mounted upon the shaft 6, the outer end of the hub of which is turned down to constitute a bearing for rotatably supporting a gear 17 in mesh with the smaller gear of each double gear 14. The other end of the hub of the gear 16 has mounted upon it a cam member 18 provided with operating handles 19, as shown in Fig. 9, by which the cam member may be rotated upon the shaft 6 relatively to the gear 16, as a result of which the clutch pins 20 or the clutch pins 21 may be withdrawn into the hub of the gear 16, as desired. The construction of the cam member 18 is such, as shown in Figs. 6, 7, 8 and 9, that when the clutch pins 20 are withdrawn into the hub of the gear 16, the clutch pins 21 are freed so that their springs may force them into coöperating holes in the gear 15, for which condition rotation of the gear 16 will cause rotation of the gear 15 and thus, by the relation between the gear 15 and the larger gear of each double gear 14, will rotate both of said double gears. When the clutch member 18 is rotated so as to move the clutch pins 21 into the hub of the gear 16 and free the clutch pins 20, so that their springs may project them into coöperating holes in the gear 17, rotation of the gear 16 causes corresponding rotation of the gear 17 and thus, through the engagement between it and the smaller gear of each of the double gears 14, causes rotation of the double gears 14 at a definite ratio. The cam member 18 is so designed that there is a delay surface between the two conditions just referred to, so that by turning the cam member to its mid position both sets of clutch pins are withdrawn into the hub of the gear 16, thus freeing both the gear 15 and the gear 17, for which condition the tractor mechanism will not be driven. The relation of one of the clutch pins 20 to the hub of the gear 16 and the gear 17, as well as to the cam member 18, is better shown in Fig. 10. The position of the parts shown in Fig. 6 is that for which the clutch pins 21 are in operating engagement with the gear 15, while the gear 17 is free to rotate upon the gear 16. The relation of parts in Fig. 8 is the reverse, that is, the clutch pins 20 are in engagement with the gear 17 and the gear 15 is free to rotate relatively to the gear 16. The relation of the parts in Fig. 7 shows both sets of clutch pins withdrawn into the hub of the gear 16, as a result of which both of the gears 15 and 17 are free to rotate relatively to the gear 16, or vice versa.

Each gear 16 meshes with a pinion 22 secured to the hub of one of the rear wheels 23 of the automobile 24 supported upon the tractor frame. As indicated in Fig. 2, each main wheel 11 has mounted within it an internal gear 25, which meshes with each of the larger gears of the double gears 14. From the construction described, it will appear that rotation of the automobile wheels 23 by means of the power devices carried by the automobile will rotate the gears 16 and thus, by means of the gear trains above referred to, the internal gears 25 and the main wheels 11 of the tractor mechanism. Each internal gear 25 is supported from the rim of the corresponding tractor wheel 11 by brackets 26 secured at their ends to the rim of the tractor wheel, while their central portions are pivotally secured to lugs extending outward from the internal gear 25. This construction facilitates some play of the rim of the tractor wheel relatively to the internal gear, as a result of which if the rim which has some flexibility should strike a stone, the slight change in conformation temporarily resulting in the rim will produce no apparent change in the conformation of the internal gear 25, as a result of which it is in position at all times to operate properly. The rim of each wheel is provided with spikes 27 which may be removed by undoing the nuts inside of the rim threaded upon the inner ends of said spikes, so that the driving wheels may be equipped, if desired, for soft ground by placing the spikes in position, or when the ground is hard or for use on the road the spikes may be removed. Furthermore, the number of spikes employed may be varied for different conditions, so that the required amount of traction may be secured.

Each driving pinion 22, as shown in Figs. 3 and 4, is spaced the proper distance from the automobile wheel 23 by means of the spider 28, which is fastened to it by means of screws 22ª. The spider surrounds the end of the corresponding automobile wheel hub 31 and is provided with lugs 29, engaging the sides of the rivet or bolt heads used in the construction of the automobile wheel.

The pinion 22 is held in a concentric position by means of a shouldered hub cap 30 which is fitted to the threaded end of the hub 31. The hub cap 30 is screwed onto the hub 31 until its shoulder engages with a corresponding recess in the face of the pinion 22, such that when the hub cap 30 is screwed so as to press the lugs 29 firmly against the flange of the hub on either side of the rivet heads, the pinion 22 is firmly held in a concentric position and the maximum driving effect represented by the strength of all of the rivets employed in the automobile wheel may be transmitted to the pinion with comparatively little strain on the cap used to hold it in place. The periphery of the spider 28 forms a drum which is used in mounting the automobile upon the tractor frame, as follows: The front end of the tractor is placed upon the ground and the automobile is backed astraddle of the frame until the saddles 32 clamped to the auto axle 39 touch the top angle-bars 2 of the girders of the frame. The ropes 46 are fastened to the spiders 28 and the draw-bar 100 by means of hooks and the automobile is continued in its backward motion until the rear wheels 23 begin to revolve free of the ground causing the ropes 46 to be wound on the periphery of the said spiders 28, thus moving the automobile backward bodily on the top of the girders to a position just back of the forward position of the clamp arms 36, which clamp arms are pivoted to the web plates 1 at 37 and provided at their upper ends with hooks 38 for engaging the saddles 32.

Then, the forward end of the girders is raised by a jack, or otherwise, until the supporting angle-bar 42 is above the rearwardly extending horizontal flange 43 secured to the front axle 44 of the automobile.

The clamp arms 36 are operated mechanically by the clamp screws 34, which clamp screws screw into the clamp arm clevises 35 pivotally connected at their forward ends with the clamp arms 36. Thus, the clamp screws 34, being formed into cranks at 33 and held in stationary rotating position by sleeves bearing against the members 5 of the frame and the crank arm, can be rotated in a clockwise and a counter-clockwise direction. For rotation of the clamp screws 34 in a direction to unscrew them, the mechanical movement in the clamp screw clevises 35 operating pivotally on the clamp arms 36 forces the said clamp arms to a position below the angle bars 2 of the girders. The clamp arms 36 in this position allow the saddles 32 to slide on the angle-bars 2 until the said saddles reach a point, where by rotating the clamp screws 34 in the opposite direction, the clamp arms 36 appear above the angle-bars 2 of the girders just in front of the saddles. Continuing this rotation, the hooks 38 of the clamp arms 36 are brought in contact with the said saddles 32, as seen in Fig. 2, and draw the automobile 24 back to a position where the rearward part of the saddles 32 engage into the stops 41, which is the operating position of the hub gears 22 with the gears 16. The forward end of the tractor frame is then lowered until the angle-bar 42 rests upon the flange 43 and the pin 45 is then inserted as indicated. The central position of this pin relatively to the axle 44 permits considerable motion of the front axle in a vertical plane out of parallelism with the rear axle of the tractor without causing unequal division of the weight carried by the automobile axle 44. When it is desired to remove the automobile from the tractor frame, the reverse of the above-described operation is performed, the pin 45 being first removed, the clamp arms 36 being then swung forward below the top of the frame girders and, by means of the ropes around the spiders 28, as shown at 46 in Fig. 1, the automobile is moved forward on the tractor frame until the wheels 23 rest upon the ground.

The draw-bar 100 is provided with a plurality of holes 101, to which various implements to be drawn by the tractor may be attached and, furthermore, these holes are so disposed along the length of the draw-bar 100, which extends transversely across the rear end of the tractor frame, that several implements may be connected to the draw-bar at the same time, each by means of its individual connection so that each implement may be attached in accordance with its particular needs. The draw-bar 100 is secured by bolts to the stiffening angle-bars 5 on the rear ends of the web-plates 1 of the said girders of the tractor frame, as shown in Fig. 2, and a plurality of holes is formed in the outstanding leg of each of the angle-bars 5 so that the draw-bar 100 may be moved vertically to meet different operating conditions.

The shaft 9 mounted upon the rear end of the tractor frame has rigidly secured thereto between its bearings 47 a pulley 48, by means of which any desired machinery may be driven. Each end of the shaft 9 has mounted thereon a gear 49 keyed upon the shaft so that it may move longitudinally thereon, but that it is incapable of rotation relatively thereto. The relation of each of these gears to the shaft 9 is more clearly shown in Fig. 5. Each gear 49 has mounted thereon a spring bolt 50, provided with a latch handle 51, by which it may be moved so that the end of the bolt is clear of the shaft 9. For this position, the gear 49 may be moved longitudinally on the shaft so that the bolt enters either the hole 52 or the hole 53. When the bolt is in the hole 52, the gear 49 is out of mesh with its driving gear and as a result the shaft 9 is not rotated when the tractor gearing is operated. When, however, the bolts 50 are in the holes 53, the gears 49 are in mesh with the gears 16 and the shaft 9 is then driven by rotation of the tractor gearing. In this way, a means is provided for operating the shaft 9 from the automobile 24 without motion of the tractor mechanism on the ground, since the cam members 18 can be moved to their mid position, entirely freeing the gears 15 and 17.

By the construction above described, I have provided a mechanism such that a tractor of considerable weight may be moved at relatively slow speed over the ground while the driving machinery of the automobile is moving at relatively fast speed, depending upon the gear ratio and, moreover, for this condition the work done by the automobile engine may be as great as when the automobile is traveling over the ground at faster speed, since the slower speed of the tractor mechanism may be compensated for by an increased pull resulting from the heavy loads that are being drawn. For this condition, I have found it desirable to increase the radiating capacity of the machine as a whole, so that the cooling water employed in the automobile engine may be more effectively cooled than is possible for the slow speed at which the machine is moving through the air, for obviously the amount of heat that must be radiated from the cooling water is as great as though the automobile were traveling through the air at high speed, but owing to the slow speed of the tractor mechanism over the ground the cooling effect of the automobile radiator is lost in large degree. To compensate for this loss, I provide an auxiliary radiator 54, mounted upon the rear end of the tractor frame, and a water supply tank 55, as clearly shown in Figs. 1 and 11.

At 56 I have shown the main radiator with which the automobile is equipped. When the automobile is used independently of the tractor mechanism, the water in the radiator 56 is drawn through pipe 57 into pump 58 and is forced through pipe 59 into the water jackets with which the cylinders of the engine 60 are provided. The water is then conducted from said water jackets through pipe 61, to the radiator 56.

Referring now to the tractor, a pipe 62 affords communication between the auxiliary radiator 54 and the tank 55. The radiator 54 and the tank 55 are each provided with a standpipe, indicated at 62' and 63 respectively. The pipes are provided with check valves 62ᵃ and 63ᵃ, which allow steam to escape from the associated water containers but prevent the entrance of air. The radiator 54 is provided with a drain cock 64, as shown.

Entering the radiator 54 at the top thereof, is a pipe 65, which as will presently be explained, is adapted to be connected with the pipe 61 of the automobile cooling equipment. Entering the tank 55 near the bottom thereof, is a pipe 66 which also may be connected with the auto cooling equipment. Interposed in this pipe is a pump 67. Interposed in pipe 61 are a pair of valves 68 and 69 which have connected thereto a pair of flexible tubes 70 and 71. Each of these valves when in one position allows communication between its associated flexible tube and the pipe 61, and when in another position cuts off such communication. When both valves are in the first position mentioned, communication between the valves is cut off.

The top of the radiator 54 and the top of the tank 55 are connected together by a pipe 102 in which there is placed a valve 103. The pipe 65 has located therein between the connection of the pipe 102 and the radiator 54 a valve 104. The pipe 66 is connected with the pipe 62 by means of a pipe 105 in which there is located a valve 106 and between the connections of the pipe 105 and the tank 55 there are located in the pipes 62 and 66 valves 107 and 108, respectively. By means of the connections and valves just described, it will appear that either the radiator 54 or the tank 55 may be connected in the water cooling system, or both may be connected therein, if desired. For example, if it is desired to use the radiator 54 alone, the valves 103, 107 and 108 are closed and the valves 104 and 106 are opened, thus allowing free circulation of the water through the radiator 54 without including the tank 55 in the water cooling system. When it is desired to include the tank 55 in the water cooling system without including the radiator 54, the valves 103 and 108 are opened and the valves 104, 106 and 107 are closed, thus allowing the water to circulate freely through the tank 55 and cutting off communication with the radiator 54. When both the radiator 54 and the tank 55 are used, the valves 103 and 106 are closed and the valves 104, 107 and 108 are opened. This arrangement is particularly convenient for including in the water cooling system as much of the radiating surface of the radiator 54 and the tank 55 as desired, for it is apparent that more radiating surface is required in warm weather than is required in cold weather and, further, that more radiating surface is required for a heavy load than is required for a light load. These valves and connections also afford the opportunity of cutting out of service either the radiator 54 or the tank 55 for purposes of repair, if necessary.

The flexible tubes 70 and 71 are connected respectively with pipes 66 and 65. Assuming that the valves 68 and 69 are in the first position mentioned above and all connections between the auto and the tractor mechanism are as illustrated, water is drawn by pump 67 through pipe 66 and forced through pipe 70 into the radiator 56, from which it passes through pipe 57, pump 58 and pipe 59 to the water jackets of the engine and from there into pipe 61. From pipe 61 the water passes through valve 68, tube 71 and pipe 65, to the auxiliary radiator which, in turn, is connected to the tank 55. From the above description, it will be noted that a large supply of cooling water is always available.

In order to effectively cool the water in the auxiliary radiator 54, an auxiliary fan 72 is mounted in front of the radiator, as shown in Fig. 1, in a bearing supported by the shaft 6, and the front end of the shaft 73 supporting and driving the auxiliary fan 72, carries a belt pulley 74, driven by a belt 75 extending over guide pulleys 76 and 77, and around a driving pulley 78 connected to one end of a shaft 79, which also has rigidly mounted thereon a sprocket wheel 80, which is driven by means of a chain 81, from a sprocket wheel carried by shaft 82. The shaft 82 is provided with a gear wheel 83, which meshes with and is driven by one of the gears 16 of the tractor mechanism. The pump 67 is operatively connected with shaft 79 which is driven through chain 81.

While I have shown my invention in the particular embodiments herein described, I do not, however, limit myself to these constructions, as I may use any equivalent constructions without departing from the spirit of my invention.

What I claim is:

1. In an automobile tractor, the combination of a framework for supporting in part an automobile, tractor wheels carried by the framework, two trains of gearing of different ratio between the driving wheels of the automobile when in place on the frame and the tractor wheels, clutch pins for connecting either driving train as desired, and a rotary cam mechanism for operating the clutch pins.

2. In an automobile tractor, the combination of a framework for supporting in part an automobile, tractor wheels carried by the framework, two trains of gearing of different ratio between the driving wheels of the automobile when in place on the frame and the tractor wheels, and clutch mechanism for operatively connecting either gear train as desired.

3. In an automobile tractor, the combination of a framework for supporting in part an automobile, tractor wheels carried by the framework, two trains of gearing of different ratio between the driving wheels of the automobile when in place on the frame and the tractor wheels, a shaft rotatably mounted upon the frame, a pulley secured to the shaft, a gear for connecting the shaft with the gearing between the said driving wheels and the tractor wheels, and clutch mechanism for operatively connecting either train of gearing between the said driving wheels and the tractor wheels, said clutch mechanism adapted to render both trains inoperative to drive the tractor wheels when the shaft is connected with said gearing.

4. In an automobile tractor, the combination of a frame for supporting the rear end of an automobile, a fixed shaft secured to the frame, tractor wheels rotatably mounted on the shaft for supporting the frame, a main gear rotatably mounted on the shaft at the side of one of the tractor wheels, said gear adapted to mesh with a pinion carried by one of the driving wheels of the automobile when in place on the tractor frame, an internal gear carried by the corresponding tractor wheel, a reducing train of gearing between the main gear and the internal gear, a clutch pin or pins extending through the hub of the main gear for operatively connecting or for disconnecting the reducing train of gearing as desired, and cam mechanism for moving the clutch pin or pins to their engaging or disengaged position as desired.

5. In an automobile tractor, the combination of a frame for supporting the rear end of an automobile, a fixed shaft secured to the frame, tractor wheels rotatably mounted on the shaft for supporting the frame, a main gear rotatably mounted on the shaft at the side of one of the tractor wheels, said gear adapted to mesh with a pinion carried by one of the driving wheels of the automobile when in place on the tractor frame, an internal gear carried by the corresponding tractor wheel, two reducing trains of gearing of different ratio between the main gear and the internal gear, a clutch pin or pins extending through the hub of the main gear for each of said reducing trains of gearing for operatively connecting it or disconnecting it as desired, and cam mechanism for moving the clutch pins into engaged or disengaged position so as to connect either train of gearing and at the same time disconnect the other train of gearing or to disconnect both trains of gearing as desired.

6. In an automobile tractor, the combination of a frame for supporting the rear end of an automobile, a fixed shaft secured to the frame, tractor wheels rotatably mounted on the shaft for supporting the frame, a main gear rotatably mounted on the shaft at the side of one of the tractor wheels, said gear adapted to mesh with a pinion carried by one of the driving wheels of the automobile when in place on the tractor frame, an internal gear carried by the corresponding tractor wheel, a reducing train of gearing between the main gear and the internal gear, a clutch pin or pins extending through the hub of the main gear for operatively connecting or for disconnecting the reducing train of gearing as desired, cam mechanism for moving the clutch pin or pins to their engaging or disengaged position as desired, a shaft rotatably supported by the frame of the tractor, a pulley secured to the shaft, and a gear or gears slidably mounted upon the shaft to drive the same, said gear or gears when in driving position being in engagement with said main gear.

7. In an automobile tractor, the combination of a frame for supporting the rear end of an automobile, levers pivoted to the frame for moving the rear axle of the automobile longitudinally on the frame, threaded clevises connected with the levers, threaded rods engaging the clevises, and cranks carried by the rods to rotate the same to operate the levers.

8. In an automobile tractor, the combination of a frame for supporting the rear end of an automobile, saddle blocks slidably mounted upon the top of the frame for engaging the rear axle of an automobile, and devices carried by the frame for engaging the saddle blocks and moving them longitudinally of the frame toward the rear end of the automobile, so that its rear wheels are off the ground.

9. In an automobile tractor, the combination of a frame adapted to support the rear end of an automobile, a supporting device secured to the front axle of the automobile, and a yielding connection between the said device and the front end of the frame to support the front end of the frame and permit the front axle of the automobile to move about said connection in a vertical plane without corresponding motion of the frame.

10. In an automobile tractor, the combination of a frame for supporting the rear end of an automobile, tractor wheels for supporting the frame, gearing for driving the tractor wheels, a pinion secured to one of the driving wheels of the automobile and meshing with said gearing, said pinion carrying projecting lugs engaging the devices holding the hub of the driving wheel together, and a cap engaging the end of the hub of the driving wheel for holding the pinion in said position.

11. In an automobile tractor, the combination of a frame for supporting the rear end of an automobile, a shaft secured to the frame, tractor wheels mounted on the shaft for supporting the frame, a main gear mounted at the side of one of the tractor wheels, said gear adapted to mesh with a pinion carried by one of the driving wheels of the automobile when in place on the tractor frame, an internal gear carried by the corresponding tractor wheel, and two reducing trains of gearing of different ratio between the main gear and the internal gear.

12. In an automobile tractor, the combination of a frame for supporting the rear end of an automobile, a fixed shaft secured to the frame, tractor wheels rotatably mounted on the shaft for supporting the frame, a main gear rotatably mounted on the shaft at the side of one of the tractor wheels, said gear adapted to mesh with a pinion carried by one of the driving wheels of the automobile when in place on the tractor frame, an internal gear carried by the corresponding tractor wheel, two reducing trains of gearing of different ratio between the main gear and the internal gear, and mechanism for operatively connecting either reducing train as desired.

13. In an automobile tractor, the combination of a frame for supporting the rear end of an automobile, a cable drum or drums carried by the automobile to be carried by the frame, and a cable extending from the drum to the frame to move the automobile on the frame by rotation of the drum.

14. In an automobile tractor, the combination of a frame for supporting the rear end of an automobile, cable drums carried by the rear wheels of the automobile to be mounted upon the frame, and cables extending from the drums to the frame for moving the automobile upon the frame by rotation of the drums.

In witness whereof, I hereunto subscribe my name this 11th day of March, A. D., 1913.

WALTER H. ZIMMERMAN.

Witnesses:
ALBERT C. BELL,
LESLIE W. FRICKE.